United States Patent [19]

Masters

[11] 4,247,279
[45] Jan. 27, 1981

[54] ROTATIONAL MOLDING SYSTEM

[76] Inventor: William E. Masters, P.O. Box 64, Liberty, S.C. 29657

[21] Appl. No.: 141,422

[22] Filed: Apr. 18, 1980

[51] Int. Cl.³ .............................................. B29C 5/04
[52] U.S. Cl. .................................... 425/430; 425/429; 425/434; 425/435; 425/DIG. 238
[58] Field of Search ............. 425/430, DIG. 238, 429, 425/434, 435

[56] References Cited
U.S. PATENT DOCUMENTS

| 3,202,745 | 8/1965 | Ringdal | 425/429 |
| 3,413,687 | 12/1968 | Bauers | 425/435 |
| 3,822,980 | 7/1974 | Graeper | 425/429 |
| 4,102,624 | 7/1978 | Corona | 425/430 |

Primary Examiner—James H. Derrington
Attorney, Agent, or Firm—Bailey, Dority & Flint

[57] ABSTRACT

A rotational molding system is disclosed in which a pair of large boat molds carried on separate carriages are alternately heated in a double open-ended oven having opposing cantilevered side sections for receiving concentric drive arrangements wherein the molds may be driven about two perpendicular axes in a rocking or full rotational motion.

6 Claims, 6 Drawing Figures

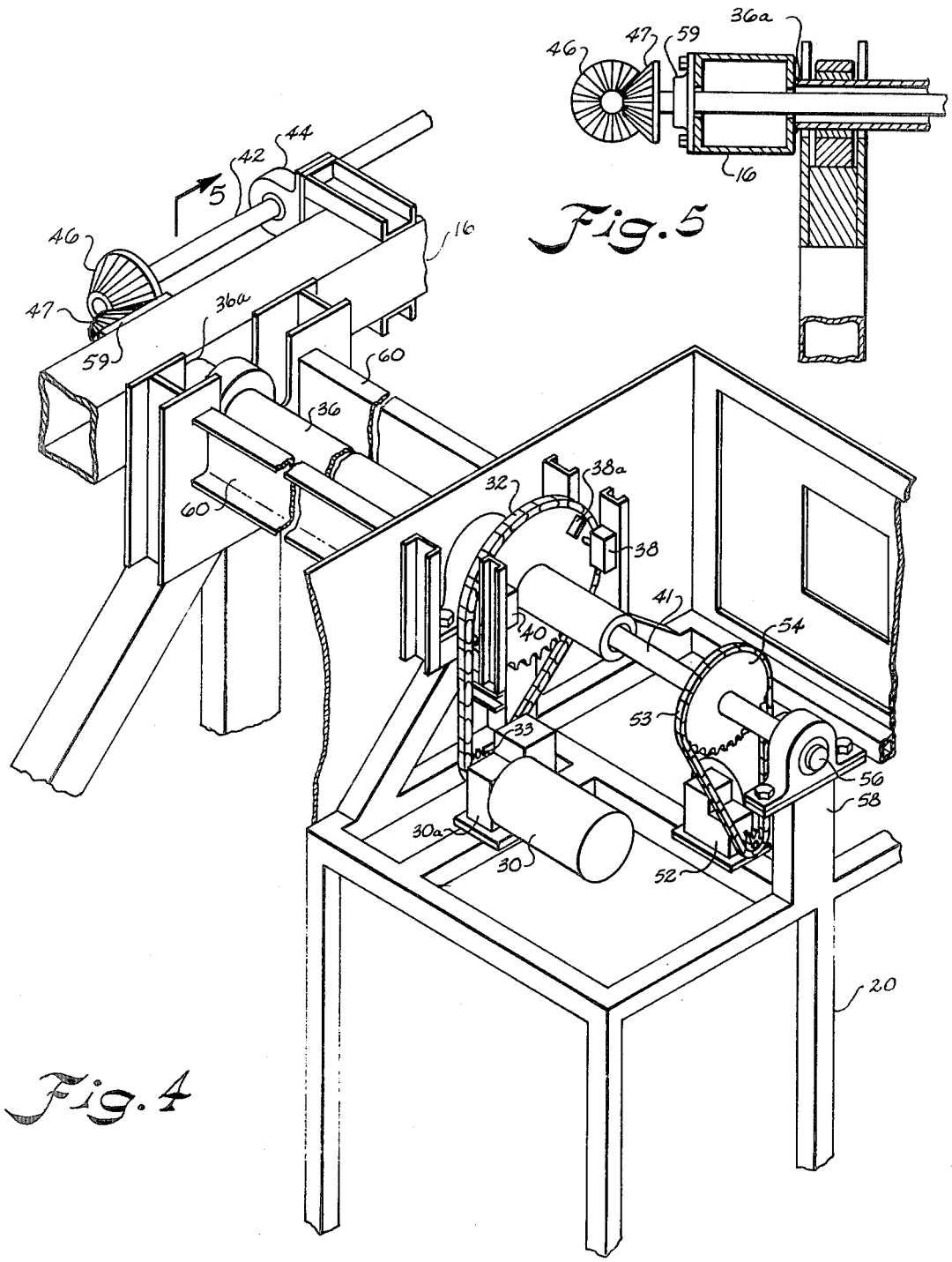

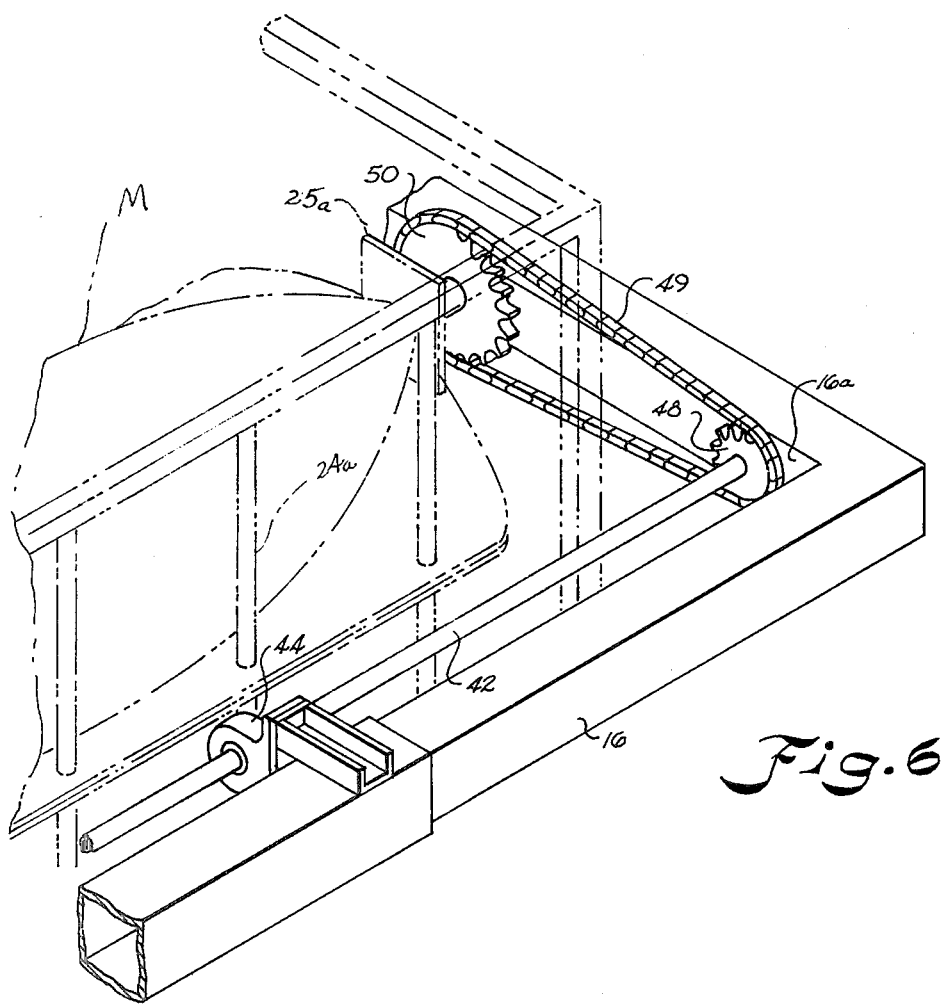

ROTATIONAL MOLDING SYSTEM

BACKGROUND OF THE INVENTION

Heretofore, rotational molding systems have utilized ovens and offset tracks along which carriages travel which support the molds in a cantilevered manner. The cantilevered structure slides in a slot formed in the oven wall in moving the relatively small molds into the oven. However, these systems are not satisfactory for large molds which require separate carriages and excessive floor space for processing the molded articles.

Accordingly, an important object of the present invention is to provide a rotational molding system for processing a plurality of large molds in alternate heating and cooling cycles wherein the amount of floor space required is minimized.

Yet another important object of the present invention is to provide a unique drive arrangement for rotating molds which affords rocking or full rotational motion.

Yet another important object of the present invention is to provide improved system and drive source arrangements for large rotating molds which allows the molds and drive sources to be carried on separate carriages and processed in a minimum of floor space.

SUMMARY OF THE INVENTION

It has been found according to the invention that a rotational molding system for large boat molds and the like may be had by utilizing a double ended oven and single track extending through the oven with alternate tracks offset on each side of the oven so that a pair of the rotating molds may be processed alternately in a minimum amount of floor space employing drive arrangements having concentrically arranged drive shafts, received in horizontal slots formed in opposing cantilevered side wall sections of the oven, which transmit motion to a second axis of rotation through the pivot of a perpendicular first axis of rotation whereby the mold is supported on a separate carriage frame.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 4 is a perspective view illustrating components of a drive arrangement for a rotational molding system constructed according to the invention;

FIG. 5 is a top plan view with parts in section illustrating components of a drive arrangement constructed according to the invention; and FIG. 6 is a perspective view illustrating drive components for rotation about the longitudinal mold axis according to the invention.

DESCRIPTION OF A PREFERRED EMBODIMENT

Figure 1:
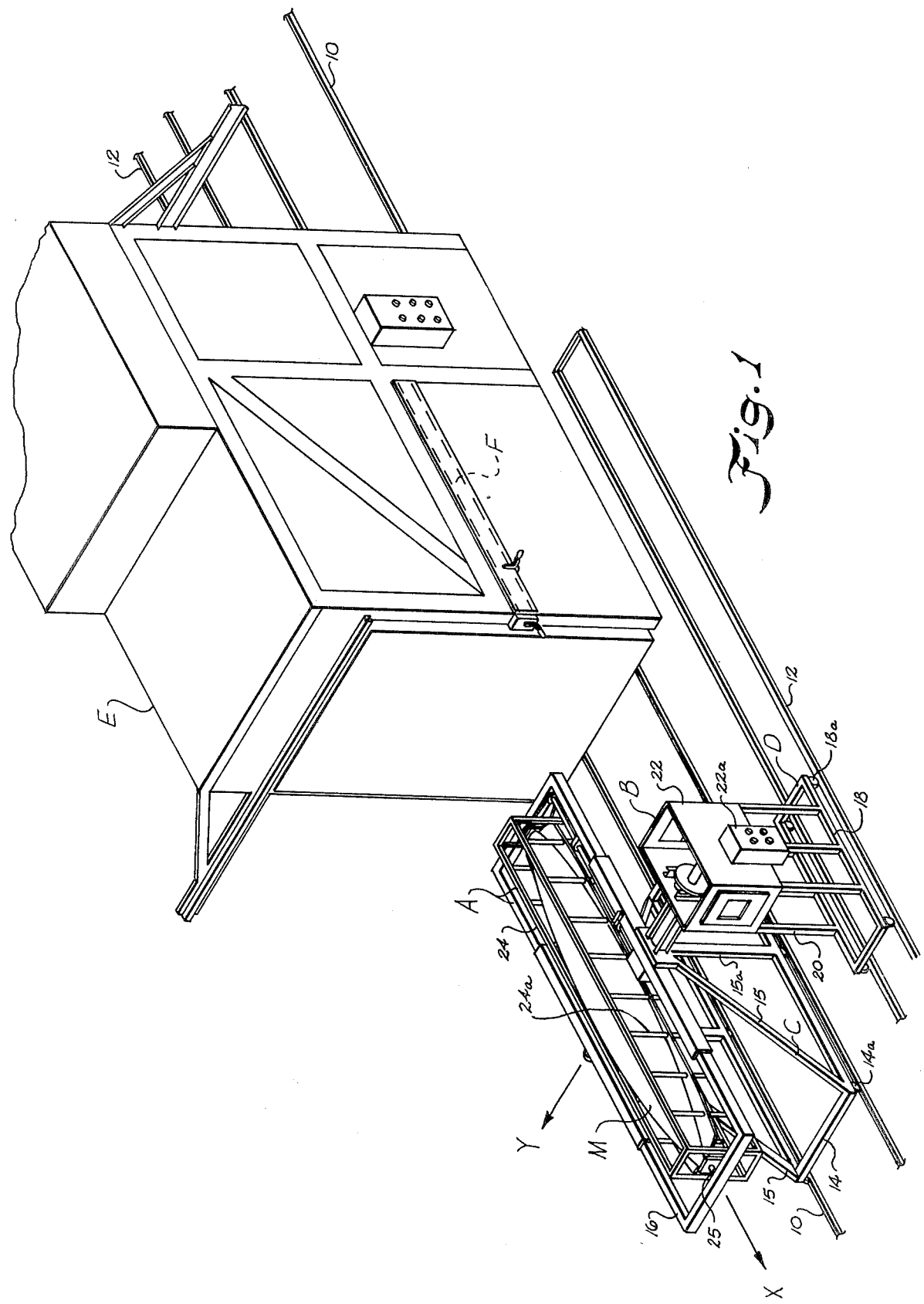
FIG. 1 is a perspective view illustrating a rotational molding system constructed according to the invention.

The invention relates to a system for rotational molding of an article which includes the process of rotating a hollow metal mold about two perpendicular axes in the presence of heat. The mold is charged with a ground plastic powder. As the mold rotates in the presence of heat, the powder melts and sticks to the interior of the mold. The distribution of powder is determined by the speed and duration of the rotation of the mold about the two axes in relation to each other. After the heat cycle, the mold is cooled by fans while it still rotates. Such systems have been known which typically include at least one rotating mold, an oven in which the mold is received, and a carriage from which the mold is supported in a cantilevered manner for movement into the oven. Such systems have been utilized in the molding of relatively small articles wherein the molds are capable of being supported in a cantilevered manner.

According to the present invention, a rotating mold system is disclosed which comprises a frame A for carrying the mold M and a drive source means B which includes reversible motor assemblies. A first drive means is connected to the drive source means for rotating the mold about a first axis Y and a second drive means is connected to the drive source means for rotating the mold about a second axis of rotation X. A first carriage means C is provided for carrying and moving the frame and mold with the mold being supported on the carriage means about the X axis which is the longitudinal axis of the mold. A second carriage means D is provided for carrying and moving the drive source means B. An oven E includes an integral enclosure having opposed end walls, opposing side walls, and a top wall. Each of the end walls is openable for receiving a mold alternately through either end. Each side wall of the oven includes an elongated horizontal slot F defining a cantilevered wall section on each side of the oven. The first drive means includes a first drive shaft rigidly connected to the frame A defining a pivot for said frame about the axis of rotation Y. The second drive shaft means includes a second drive shaft with the first and second drive shafts being carried concentrically with respect to one another. The second drive shaft provides rotation of the mold about the longitudinal axis of rotation X. The concentrically carried drive shafts are receivable in horizontal slot F for transmitting the rotational motions to the frame and mold.

A first track 10 extends through both ends of the oven E disposed centrally therein over which carriage C may travel in moving a mold through either end of the oven. Second track means 12 are offset on each side of the oven E along which the drive source B moves unitarily with the mold by means of carriage D. Carriage C includes a rectangular bottom frame 14 on which suitable wheels 14a are carried which roll along the track 10. Inclined supports 15 and upstanding support 15a are provided which support the rectangular portion 16 of the mold frame A in a pivotable manner. Carriage D may likewise include a rectangular frame 18 and wheels 18a which are guided over the track 12. Upstanding supports 20 carry a housing 22 in which the power drive source B is enclosed. Suitable controls for the drive arrangement may be carried in a panel box 22a attached to the housing 22. Variation in the speed, duration, and angular extent of rotation may be had in a desired manner by application of any conventional control system.

Frame A includes a cage frame 24 carried within the rectangular frame 16 which clamps and contains the mold in a closed configuration during molding. Bars 24a are normally attached to the mold and are removable from the frame 24 which is typically held together by tensioners (not shown). The cage frame 24 is pivotably attached to rectangular frame 16 about the longitudinal axes Y of the mold by means of attachment plate and shaft 25 connected to one end of the mold and plate and shaft 25a carried on the remote end of the mold.

Referring now in more detail to FIGS. 4 through 6 a drive arrangement constructed according to the invention will be described. The cage frame 24 and mold rotate about longitudinal rotational axis X. The rectangular frame 16, in turn holds the mold and cage frame 24 and is pivoted on two bearings 26a and 26b about rotational axis Y. The first drive means which rotates the frame A and mold about the Y axis includes a motor 30 and gear reducer 30a. The motor 30 is a variable speed reversible motor which allows speed and direction control of the mold about the Y axis. A chain 32 is driven by the motor 30 by means of a suitable sprocket gear 33 and, in turn, chain 32 drives a large sprocket 34 affixed onto a first drive shaft 36 of the first drive means. The shaft 36 is welded to the rectangular frame 16 at 36a.

Thus, the motor assembly 30 drives chain 32 which turns sprocket 34 which in turn, rotates shaft 36 and frame 16 about the pivot defined by the connection of the shaft and frame at 36a. The first drive and shaft 36 may be operated in full rotation or partial rotation. As illustrated, rotational limit means are provided in the form of limit switches 38 and 40 engaged by angularly spaced stops 38a and 40a (not shown) which trip the limit switch at the appropriate point in rotation to reverse the rotation of the motor assembly 30 and hence shaft 36. In this manner, the mold will rock and distribute the powder plastic as it melts evenly along the length of the mold. Suitable wiring connecting the limit switches and the motor 30 may be had as well as control therefrom in conventional manner. Full rotation may be had by de-activating switches 38 and 40 removing them from the control circuit (not shown) in a conventional manner.

The second drive for rotation about the X axis includes a second drive shaft 41 carried concentrically within hollow shaft 36. Intermediate drive means connecting drive shaft 41 and the mold and frame 24, includes shaft 42 carried generally parallel to the frame 16 by means of a bearing 44 and suitable journal bearing in leg 16a of frame 16. A bevel gear 46 is carried on an end of shaft 42 and meshes with a bevel gear 47 carried on the end of shaft 41. A sprocket 48 is carried on the remote end of shaft 42 which carries a drive chain belt 49 which drives sprocket 50 affixed to the end of a stub shaft 25a which is affixed to the mold and cage frame 24 to effect rotation of the mold about longitudinal axis X.

The drive source means further includes a reversible, variable speed motor assembly 52 which drives shaft 41 by means of a chain 53 and sprocket 54. The distal end of the shaft 41 is journaled in a bearing 56 carried on a frame post 58 at one end and in bearing 59 adjacent a remote end. It will be noted that shafts 36 and 41 are concentrically arranged with one another so that they may be received through horizontal slot F formed in the oven wall and drive the mold about axis X with shaft 41 extending through the pivot connection of shaft 36 and frame 16 whereby mold M may be carried on a separate carriage in an expedient manner.

Suitable framework such as C-channels 60 connected between carriage means D and C may be provided whereby the carriage means travel in a unitary fashion over their respective track means either by manual movement or automated movement.

Figure 2:
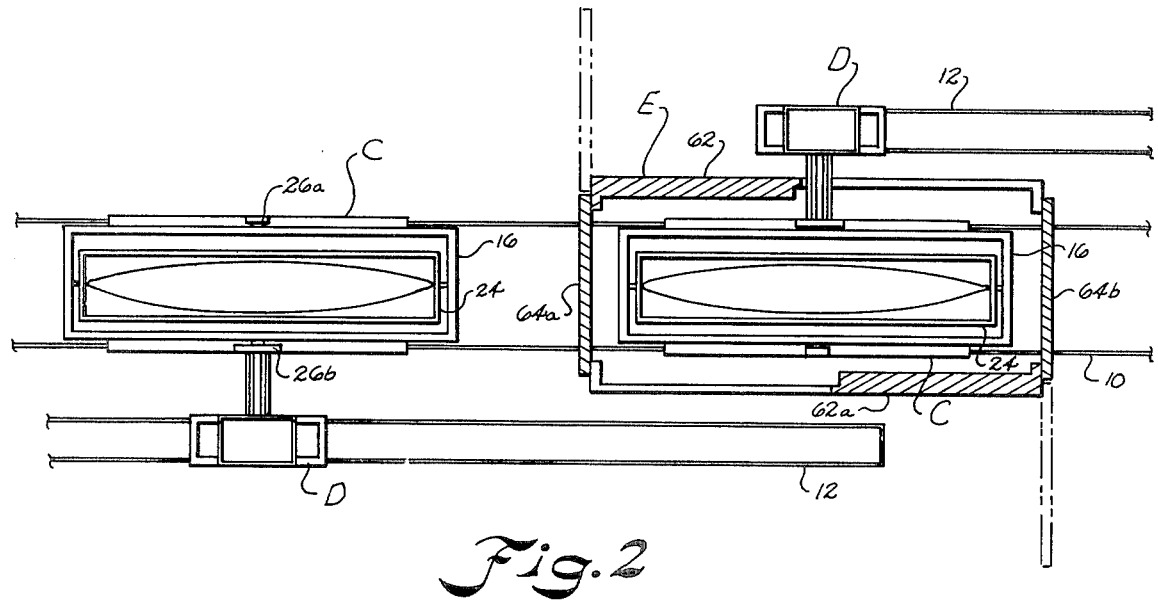
FIG. 2 is a schematic top plan view of a rotational molding system constructed according to the invention with the oven cut in section.
Figure 3:
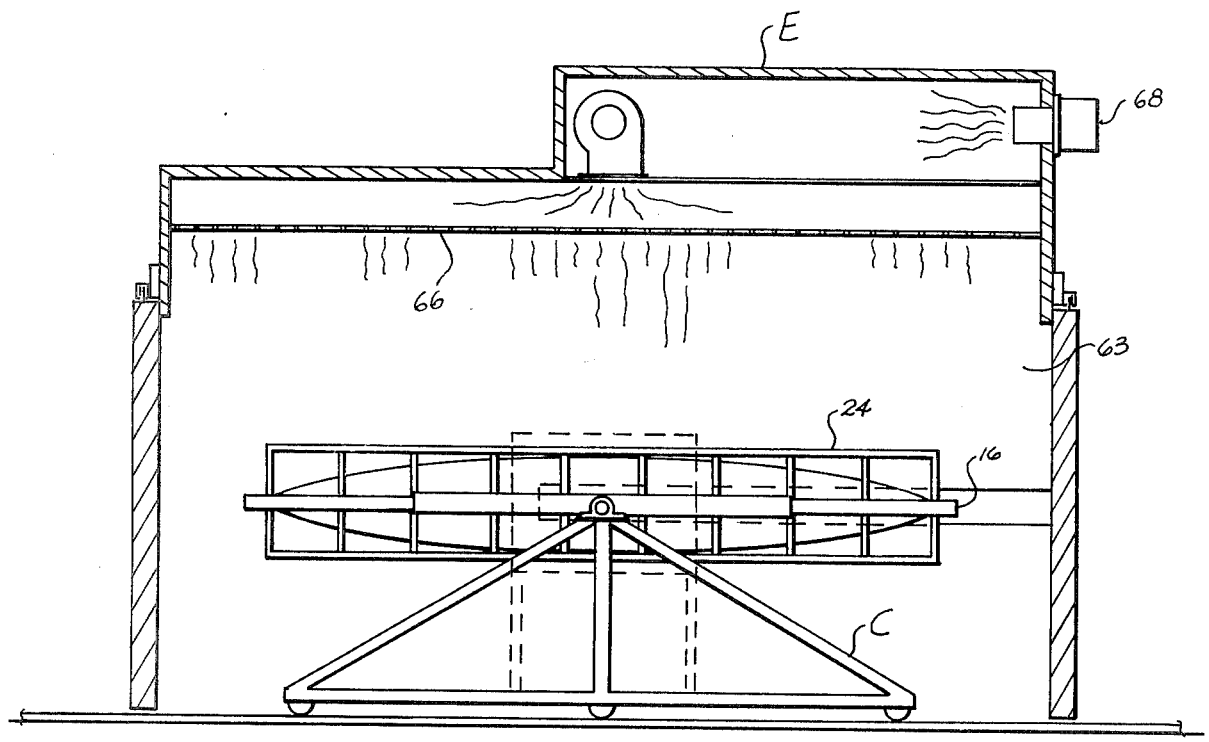
FIG. 3 is a side elevation illustrating a rotational molding system constructed according to the invention with the oven in section.

Referring now to FIG. 2, oven apparatus is illustrated as including horizontal slot F formed in opposed side wall sections 62 and 62a which define a cantilevered section 63 above the slot on each side of the oven. Mold M is received coming through either openable end 64a or 64b of the oven. In this manner, relatively large molds such as for molding boat hulls may be utilized in a minimum amount of floor space compared to the relative size of the mold due to the double-ended configuration and cantilevered sides of the oven, and drive arrangement herein. The airflow in the oven is from top to bottom utilizing a perforated hot air plenum 66 in the top and cold air return (not shown) on the bottom sides picking up air at the bottom of the oven. Gas or electric heat at 68 may be utilized.

The above described arrangement and system allows the mold to be carried on a carriage separate from the drive source satisfying the problems associated with mold weight and the utilization of a plurality of such molds in a minimum of floor space. As one mold is removed from the oven for cooling, the next mold may be inserted in the oven for heating. With the mold in the cooling cycle, it may be cooled by fans, blowers and the like while it still rocks or rotates adjacent the oven by means of the drive carried on carriage D. In this manner little movement of the mold is required during heating and cooling such that transportation of the mold does not affect the molding process. The advantageous arrangement disclosed avoids the use of elaborate track and carriage systems otherwise required for the alternate processing of a plurality of molds in the molding of large articles.

While a preferred embodiment of the invention has been described using specific terms, such description is for illustrative purposes only, and it is to be understood that changes and variations may be made without departing from the spirit or scope of the following claims.

What is claimed is:

1. A rotating mold system of the type which includes at least one rotating mold, an oven in which said mold is receivable, and track means over which said rotating mold is movable, said systems comprising;
    a frame for carrying said mold;
    drive source means including a reversible drive motor means;
    first drive means connected to said drive source means for rotating said mold about a first axis of rotation;
    second drive means connected to said drive source means for rotating said mold about a second axis of rotation;
    first carriage means for carrying and moving said frame and mold, said mold being supported on said carriage means about a longitudinal axis;
    second carriage means for carrying and moving said drive source means;
    said oven including an integral enclosure having opposing end walls, opposing side walls, and a top wall;

each said end wall being openable for receiving a mold alternately through either such end;

each said side wall of said oven including an elongated horizontal slot defining a cantilevered wall section on each side of said oven;

said first drive means including a first drive shaft rigidly connected to said frame defining a pivot for said frame about said first axis of rotation;

said second drive means including a second drive shaft, said first and second drive shafts being carried concentrically with respect to one another, said second drive shaft providing rotation of said mold about said second and longitudinal axis of rotation; and said concentrically carried drive shafts being receivable in said horizontal slot for transmitting said rotational drives to said frame and mold.

2. The system of claim 1 wherein said first axis of rotation is perpendicular to said longitudinal axis of said mold, said drive means including a rotational limit means for limiting the rotational movement of said frame and mold in alternate directions about said first axis between angularly spaced alternate limit positions.

3. The system of claim 2 wherein said second drive means includes intermediate drive means connecting said second drive shaft and said frame for rotating said mold about said longitudinal axis.

4. The system of claim 1 or 3 wherein said second drive shaft extends through said pivot to drive said intermediate drive means.

5. The system of claim 4 including framework rigidly connecting said first and second carriage means, said framework received in said horizontal slot providing unitary travel of said carriage means.

6. The system of claim 1 including first track means within the interior of said oven and extending through each of said openable ends, wherein said at least one mold comprises two molds each carried by a separate first carriage means on said first track means, one of said molds carried at each said end of said oven for being alternately received into said oven through a respective end, offset track means carried adjacent opposing sides of said oven, said second carriage means and drive source means carried on each said offset track means for rotating respective ones of said molds by means of first and second drive means and said first and second concentrically carried drive shafts received through respective ones of said horizontal slots whereby said two molds may be utilized in alternate heating and cooling cycles in a minimum of floor space relative to said mold size.

* * * * *